June 4, 1963    J. G. WILDER, JR    3,091,924
GASEOUS NOZZLE BOUNDARY
Filed Dec. 15, 1960

INVENTOR:—
JOHN G. WILDER, JR.
BY
Eckhoff and Slick
ATTORNEYS

# United States Patent Office 3,091,924
Patented June 4, 1963

3,091,924
GASEOUS NOZZLE BOUNDARY
John G. Wilder, Jr., Los Altos, Calif., assignor to United Aircraft Corporation, a corporation of Delaware
Filed Dec. 15, 1960, Ser. No. 76,000
2 Claims. (Cl. 60—35.54)

This invention relates to a nozzle structure for use on a solid propellant rocket engine and more particularly relates to a reliable nozzle of low weight which may incorporate thrust vector control and rocket thrust control.

One of the major problems in the successful use of solid propellant rocket engines is that of providing a satisfactory nozzle structure with respect to weight, reliability and life of the nozzle. Another major problem is that of thrust vector control. A further problem is that of providing a solid propellant engine wherein the thrust can be varied.

Heretofore it has been the practice in constructing rocket nozzles to make them of extremely heavy metal to withstand the strain imposed by the high gas pressure developed by the rocket engine and also to act as a heat sink. Obviously, nozzles constructed in this manner are heavy and thus detract from the efficiency of the engine and are expensive to construct.

Although a number of systems for thrust vector control have been proposed, such as the use of aerodynamic surfaces, gimballed engines, the use of auxiliary rockets or the insertion of some form of mechanical device in the jet stream, all of these proposals have certain disadvantages such as weight, necessity for hot gas seals, and general lack of reliability.

Heretofore it has not been practical to vary the thrust of solid propellant engines.

In accordance with the present invention, a gaseous nozzle boundary for the high temperature gases produced by high performance solid propellant engines is used to replace the heavy nozzle now generally employed. Thus there is provided a light weight, inexpensive nozzle which provides thrust vector control and thrust control.

Generally speaking, the invention is carried out by providing a secondary propellant grain in the annulus surrounding the nozzle, said grain burning at a relatively low temperature and having clean gas characteristics by comparison with the main propellant. The nozzle itself can be made of relatively light weight material since it is not exposed to high temperature gases and since the pressure is substantially balanced on both surfaces of the nozzle liner. The nozzle lining is provided with a series of perforations so that gas is injected into the nozzle stream over a large area of the nozzle, providing a boundary layer of relatively cool, clean gas which protects the surface of the nozzle from hot gas from the main propellant grain as well as from impingement by solid combustion products. Thus, the metal throat of the nozzle may be ¼ inch or even thinner, even in a relatively large rocket engine as contrasted to conventional nozzle structures which may be several times as thick. The number of perforations can vary axially such that the mass flow rate of the control gas is approximately constant per unit area of the liner in order to maintain an even cool gaseous boundary layer. Since the boundary layer is built up from a large number of sources, it is relatively easy to provide a positive control of the boundary layer thickness.

Another aspect of the present invention is that it lends itself to an easy method of thrust vector control. As has been pointed out above, thrust vector control for a solid propellant rocket has heretofore been difficult to achieve. However, by varying the porosity at a desired point in the nozzle, ordinarily in the divergent section, one or more shock waves can be set up in the exit gas stream to achieve thrust vector control. Thus thrust vector control is obtained at slight extra weight and complexity. Further, since the valving arrangement for achieving the thrust vector control is not in the hot gas stream but is in the gas stream of the relatively cool secondary propellant, the problems normally associated with actuating valves in a hot gas stream are largely obviated. Additionally, the secondary propellant occupies a space normally wasted in a rocket engine and adds to the thrust of the engine. Thus a rocket of greater efficiency is achieved.

In addition to being able to vary the stream to achieve vector control, it is also possible to vary the porosity symmetrically around the throat to achieve a solid propellant rocket having variable thrust. Thus, if the porosity is increased in the throat area the effective diameter of the throat is decreased while if a given region is made less porous, the area of the throat is effectively increased.

In the drawings forming part of this application:

Figure 1:
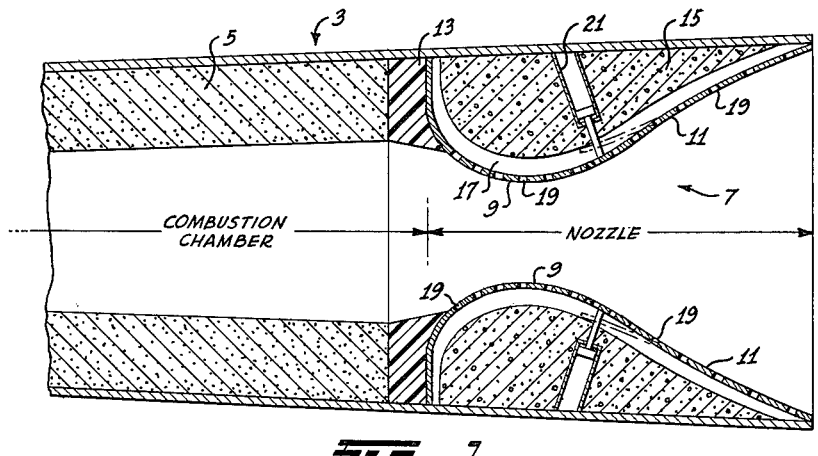
FIGURE 1 is a sectional view of the aft end of a rocket engine embodying the throat structure of the present invention.
Figure 2:
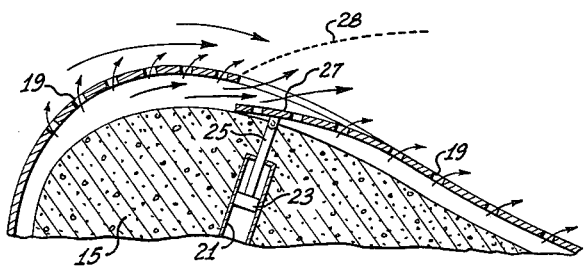
FIGURE 2 is an enlarged fragmentary view of the throat area shown in FIGURE 1, illustrating the method in which the boundary layer and shock wave are formed.
Figure 3:
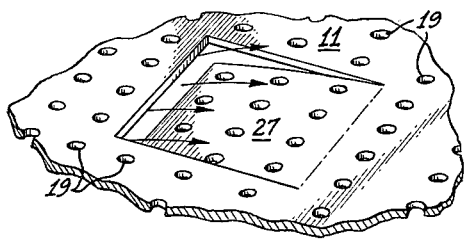
FIGURE 3 is a partial perspective view of FIGURE 2.

Turning now to a description of the drawings by reference characters, there is shown a rocket engine having a casing 3 with a main propellant grain 5 therein. The propellant grain 5 may be any of the high performance grains well known to those skilled in the art and which produces gas having a high temperature and which may contain solid combustion products. Aft of the grain 5 is a nozzle generally designated 7 having a throat 9 and a divergent section 11. A portion of the space between the nozzle 7 and the grain 5 may be filled with an inhibitor 13. Within the annular space formed on the outside of the nozzle 7 is a secondary grain 15. This secondary grain produces an off gas which has a substantially lower temperature than the gas produced by the grain 5 and which is free of solid combustion products. It will be noted that the grain 15 does not occupy the entire annular space surrounding the nozzle 7 but that a small passage 17 is provided between the wall of the nozzle and the surface of the grain for the free passage of gas. The nozzle 7 contains a number of openings 19 which are preferably circular. It will be noted that these openings are more closely spaced in the neighborhood of the throat 9 than they are in the neighborhood of the divergent section 11. Thus at the most constricted portion of the nozzle, more openings are used since more gas is necessary at this point to provide the necessary boundary layer. The openings are spaced evenly around any plane intersecting the nozzle at right angles to the axis.

Various means may be used to vary the porosity of various sections of the nozzle. For instance, a solid sheet of metal may be provided under and parallel with the perforated metal of the nozzle with means for moving the sheet closer or further away from the porous throat. Another system is to employ a slidable sheet of metal having perforations corresponding to the perforations in the nozzle. Such a sheet may be slid along the inner wall of the nozzle, bringing the perforations in and out of registration. In the embodiment illustrated, a series of flaps 27 is cut from the walls of the nozzle, the flaps being left attached along one edge so that the flaps can be moved. A plurality of cylinders 21 is then provided within the secondary propellant 15 having pistons 23 therein actuated by means not shown, which are attached to the piston rods 25 which in turn are attached to flaps 27. It will be apparent that movement of the flaps 27"

varies the porosity of the throat and is capable of setting up a shock wave as at 28.

Normally, at least three such flaps or porosity varying means would be employed, distributed at equal angles radially around the divergent portion of the nozzle or four or even a larger number may be used. Further, more than one set of porosity varying means may be employed. It will be understood, of course, that the exact location and number of the porosity varying means in the nozzle will depend on whether the objective is thrust control, thrust vector control or both.

Various propellants can be used as is well known to those skilled in the art. For instance, the "hot" propellant 5 can be aluminized ammonium perchlorate with polyurethane while the "cool" propellant 15 might be ammonium nitrate with rubber.

It is believed apparent from the foregoing that I have provided a rocket engine nozzle of improved design wherein the nozzle has light weight, achieves thrust vector control and thrust control.

I claim:

1. A solid propellant rocket engine having a main combustion chamber with a discharge nozzle attached thereto, said combustion chamber having therein a first solid propellant which burns at a relatively high temperature, said nozzle being of a relatively light construction and normally unable to resist the temperature and pressure developed by said first solid propellant, an annular chamber surrounding said combustion zone, said annular chamber having a second solid propellant therein, said second solid propellant burning at a relatively low temperature and having clean gas characteristics by comparison with said first propellant, and perforations through said nozzle connecting said chamber containing the second solid propellant with the inner surface of the nozzle whereby the off gas from the said second solid propellant passes through said perforations into the main gas stream, forming a boundary layer in said discharge nozzle protecting the surface thereof and whereby the gas pressure from the second solid propellant exerts a pressure on the outside of the nozzle tending to counterbalance the pressure of the off gas from the first solid propellant and enabling the said relatively light nozzle to withstand the temperature and pressure of the first solid propellant.

2. The rocket engine of claim 1 wherein valving means connected to the exhaust nozzle are provided to control the flow of off gas from the secondary propellant to the nozzle thereby achieving thrust control and thrust vector control of the rocket engine.

References Cited in the file of this patent

UNITED STATES PATENTS

| 2,354,151 | Skoglund | July 18, 1944 |
| 2,395,114 | Goddard | Feb. 19, 1946 |
| 2,439,473 | Kalitinsky | Apr. 13, 1948 |
| 2,625,007 | Truax | Jan. 13, 1953 |
| 2,694,898 | Stauff | Nov. 23, 1954 |
| 2,916,873 | Walker | Dec. 15, 1959 |
| 2,943,821 | Wetherbee | July 5, 1960 |

FOREIGN PATENTS

| 1,197,701 | France | June 8, 1959 |